United States Patent [19]

Utaka et al.

[11] Patent Number: 4,805,975
[45] Date of Patent: Feb. 21, 1989

[54] OPTICAL WAVEGUIDE SWITCH

[75] Inventors: Katsuyuki Utaka, Musashino; Kazuo Sakai, Tokyo; Yuichi Matsushima, Tanashi, all of Japan

[73] Assignee: Kokusai Denshin Denwa Kabushiki Kaisha, Tokyo, Japan

[21] Appl. No.: 143,820

[22] Filed: Jan. 13, 1988

[30] Foreign Application Priority Data

Jan. 21, 1987 [JP] Japan ................................ 62-9942

[51] Int. Cl.⁴ .............................................. G02F 1/29
[52] U.S. Cl. ................................ 350/96.13; 350/96.15
[58] Field of Search ............... 350/96.11, 96.12, 96.13, 350/96.14, 96.15; 307/425–430

[56] References Cited

U.S. PATENT DOCUMENTS

| | | | |
|---|---|---|---|
| 4,211,467 | 7/1980 | Cross et al. | 350/96.14 |
| 4,382,660 | 5/1983 | Pratt, Jr. et al. | 350/96.14 X |
| 4,507,776 | 3/1985 | Smith | 350/96.14 X |
| 4,583,817 | 4/1986 | Papuchon | 350/96.14 |
| 4,626,075 | 12/1986 | Chemla | 350/96.14 X |

OTHER PUBLICATIONS

Wa et al., "All Optical Multiple-Quantum-Well Waveguide Switch", *Electronics Lett.,* vol. 21, No. 1, Jan. 1985, pp. 26–28, (350/96.13).

*Primary Examiner*—John D. Lee
*Attorney, Agent, or Firm*—Emmanuel J. Lobato; Robert E. Burns

[57] ABSTRACT

An optical waveguide switch is disclosed in which at least two optical waveguides intersect at a predetermined angle to each other to provide, on both sides of the intersection region, input side optical waveguide regions for receiving incident light and output side optical waveguide regions for outputting guided light, and in which the incident light is input into one of the input side optical waveguide regions and is output from a desired one of the output side optical waveguide regions. In accordance with the present invention, an optically nonlinear material whose refractive index undergoes a substantial variation, depending on the intensity of incident light, is disposed in the intersection region. A loop is provided in association with a corresponding one of the input side optical waveguide regions for essentially branching the guided light in the corresponding waveguide output side optical waveguide region for feedback to the corresponding input side optical waveguide region.

12 Claims, 5 Drawing Sheets

OPTICAL WAVEGUIDE SWITCH

BACKGROUND OF THE INVENTION

The present invention relates to an optical switch for switching the propagation path of an optical signal and, more particularly, to an optical waveguide switch which utilizes light as control energy for triggering its switching operation.

With the development of optical fiber communication, the optical switching technology for switching an optical signal to a desired channel is now attracting attention. It is considered, in particular, that as an optical line becomes increasingly common in the subscriber's system, optical switches will be needed in vast numbers, and their miniaturization and sophistication are desired. There is also a demand for development of an integrated optical switching element for adaptation to submarine switching in a submarine optical fiber transmission system or satellite-loaded switch which is limited in space and required to be highly reliable.

To meet with such requirements, mainly two types of optical switches are now under study. The one has an arrangement in which an optical signal is once converted to an electric signal (an opto-electro conversion) and is switched by an electronic circuit as in the past, thereafter being re-converted to an optical signal (an electro-opto conversion). As a result of the recent progress of the OEIC (Opto-Electronic Integrated Circuit) technology, a four-by-four optical switch, though in a hybrid structure, has been reported. This O/E/O type optical switch which involves the conversion of an optical signal to electric form and then back to optical form is readily acceptable as a miniaturized version of a conventional optical switching device formed by discrete elements. On the other hand, however, it is considered that because of a large number of elements used this optical switch has the defects of complexity in its manufacture, low reliability and an increase in crosstalk by electromagnetic interference in the electronic circuit during high-speed operation. In addition, it is difficult, at present, to obtain an ultra high-speed electronic circuit capable of satisfactory operations at high frequencies above several giga-Hz.

The other optical switch is one that switches an optical signal without conversion to an electric signal, and this switch is termed an O/O type. However, since these optical switches rely on electric energy such as a voltage and a current for switching the optical signal, they have to perform the O/E (opto-electro) conversion of a control signal superimposed on the optical signal.

SUMMARY OF THE INVENTION

An object of the present invention is to provide an optical waveguide switch which permits the switching of an optical signal without the necessity of its opto-electro conversion.

The characteristic feature of the present invention resides in that the switching section is formed using a nonlinear material whose refractive index varies with the intensity of irradiation light and a positive feedback loop is provided in the waveguide section so that the optical signal is switched intact.

BRIEF DESCRIPTION OF THE DRAWINGS

The present invention will be described in detail below in comparison with the prior art with reference to the accompanying drawings, in which.

DETAILED DESCRIPTION

To make differences between prior art and the present invention clear, prior art will first be described.

Figure 1:
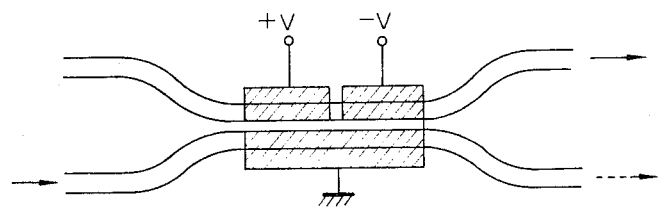
FIGS. 1 and 2 show conventional optical switches utilizing an electric control signal.
Figure 2:
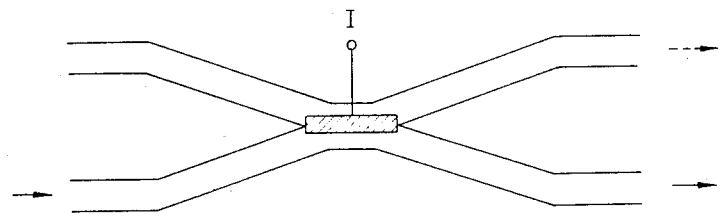

FIGS. 1 and 2 show, in elevation, conventional optical switches. The optical switch depicted in FIG. 2 employs directional couplers. By applying a voltage as a control signal to a switching section the refractive indices are varied so that the phase matching condition between two waveguides is satisfied or dissatisfied for switching incident light between them. The optical switch in FIG. 2 employs a current as a control signal. By injecting a current into the intersecting portion of two waveguides centrally thereof their refractive indices are varied with the resulting carrier density, whereby incident light is totally reflected and switched from one waveguide to the other. These optical switches do not involve the afore-mentioned O/E and E/O conversions of the optical signal, and hence have advantages that they are simple-structured and capable of switching without impairing the wide band property of the optical signal. However, since these optical switches rely on electric energy such as a voltage and a current, for switching the optical signal, they have to perform the O/E conversion of a control signal superimposed on the optical signal, and accordingly they are inevitably provided with a photodetector and circuit elements therefor.

With reference to the accompanying drawings, the present invention will hereinafter be described in detail.

Figure 3:
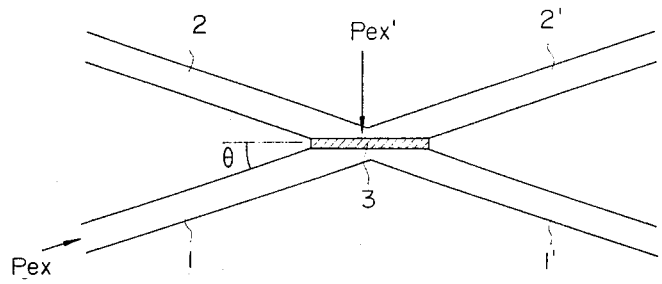
FIG. 3 is a diagram explanatory of the principle of the optical switching element of the present invention.
Figure 4A:
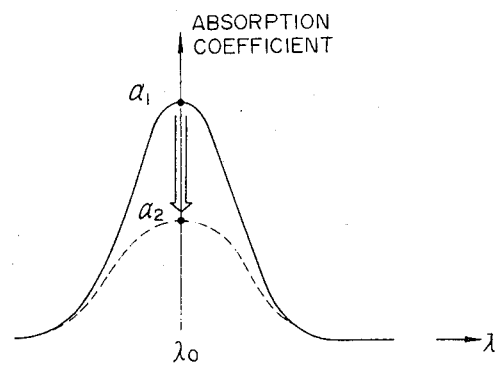
FIGS. 4A and 4B show wavelength characteristics of the absorption coefficient and refractive index of an optically nonlinear material.
Figure 4B:
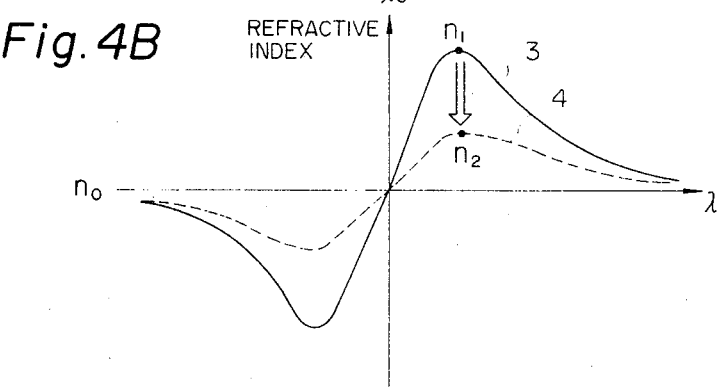

A description will be given first of the principle of operation of the optical switch according to the present invention. FIG. 3 shows the basic structure of an optical waveguide switch, explanatory of the principle of operation of the present invention. Waveguides 1, 1' and 2, 2' are provided so that they cross each other in a X-letter shape. Reference numerals 1 and 2 indicate incoming waveguides and 1' and 2' outgoing waveguides. At the center of their intersection there is disposed an optically nonlinear material 3 (such as, for example, a quantum well structure or quantum wire structure of semiconductor). The reason for which the refractive index of such a nonlinear material 3 varies is explained as follows: The optically nonlinear material 3 has an absorption spectrum based on the resonance of the levels of atoms or molecules forming it, as shown in FIG. 4A, and its absorption coefficient is related to the refractive index by the Kramers-Kronig relations, as shown in FIG. 4B. When light applied to the nonlinear material is weak, it shows such a characteristic as indicated by the solid line, but when a material of a large nonlinearity constant is irradiated by light of a certain intensity, its absorption is saturated as indicated by the broken line, and accordingly the dispersion characteristic of the refractive index also varies as indicated by the broken line. That is, the refractive index decreases at wavelengths longer than the center wavelength $\lambda_O$ of the absorption spectrum and increases at shorter wavelengths. The nonlinear material 3 of such characteristics is disposed at an appropriate angle $\theta$ to the waveguide 1, as depicted in FIG. 3, and light is applied to the nonlinear material through the waveguide 1 as indicated by $P_{ex}$ or directly from the outside as indicated by $P'_{ex}$. When the incident light has a longer wavelength than the center wavelength $\lambda_O$, the refractive index of the nonlinear material lowers sharply and the incident light from the waveguide 1 is totally reflected and is switched to the waveguide 1'. Namely, the optical path is switched by light irradiation. In this instance, if the wavelength of the incident light $P_{ex}$ ($P'_{ex}$) is selected close to the wavelength $\lambda_O$, then the light can be switched at a lower intensity. Even if the wavelength somewhat deviates from that $\lambda_O$, the same effect could be produced by increasing the light intensity. (Embodiment 1)

Now, a detailed description will be given of an embodiment which utilizes the principle of operation of the optical waveguide switch according to the present invention.

Figure 5A:
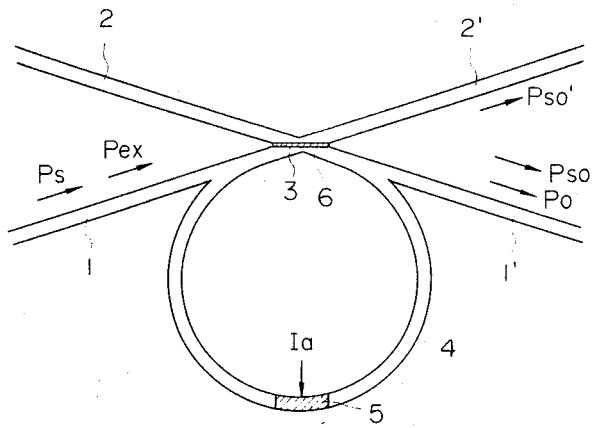
FIGS. 5A and 5B illustrate first embodiments of the optical waveguide switch of the present invention.
Figure 5B:
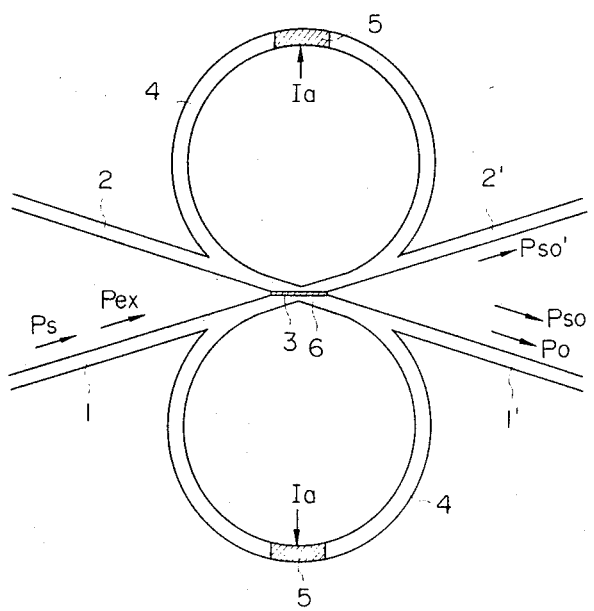
Figure 6:
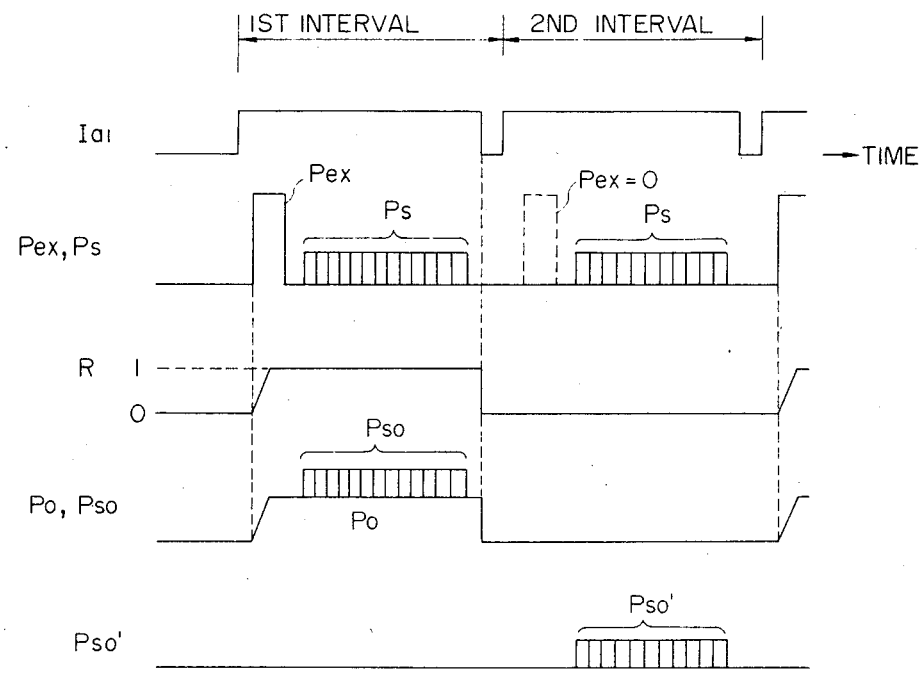
FIG. 6 is a timing chart showing the operation of the embodiments depicted in FIGS. 5A and 5B.

FIGS. 5A and 5B illustrate a first embodiment of the optical waveguide switch of the present invention, in which guided light, effective in practical applications, is used as irradiation light (hereinafter referred to as excitation light). In FIG. 5A reference numerals 1 and 2 indicate incoming side waveguides, 1' and 2' outgoing side reflection and transmission waveguides, 3 a nonlinear material, 4 a feedback waveguide, 5 an optical amplifier, and 6 a semiconductor material other than the nonlinear material 3. The incoming and outgoing waveguides 1 and 1' and the feedback waveguide 4 are formed to constitute a loop as shown. Although in this embodiment the optical feedback amplifier 5 facilitating an optical feedback is provided on the feedback waveguide 4 so that it may operate as a transmitting type optical amplifier upon injection of a current, this optical amplifier need not always be provided and only the positive feedback loop will suffice in practical applications. To facilitate a better understanding of this optical switching element, there are shown in FIG. 6 timing charts of excited light $P_{ex}$, reflected light $P_o$, reflected signal light $P_{so}$, transmitted signal light $P'_{so}$, the reflectivity R at the interface between the nonlinear material 3 and the surrounding semiconductor material 6, and an injection current $I_{al}$ to the optical amplifier 5. When the excited light $P_{ex}$ of a longer wavelength than the absorption center wavelength $\lambda_O$ is incident to the incoming side waveguide 1, it is absorbed by the nonlinear material 3, in consequence of which the absorption coefficient of the nonlinear material 3 decreases as shown in FIG. 4 and its refractive index also lowers correspondingly. Since the refractive indices of the nonlinear material 3 and the surrounding material 6 are selected such that they are equal to each other in the absence of the excitation light $P_{ex}$, the reflectivity at the interface between them is zero. When a refractive index difference has occurred upon incidence of light $P_{ex}$, the reflectivity R starts to increase and a portion of the light $P_{ex}$ is reflected toward the outgoing side waveguide 1'. Further, a portion of the reflected light $P_o$ is branched into the feedback waveguide 4, in which it is amplified by the optical amplifier 5, and the amplified light is led again to the incoming side waveguide 1, thereafter being absorbed by the nonlinear material 3. This process further promotes the reduction of the absorption coefficient of the nonlinear material 3, and consequently the reflected light $P_o$ also increases. That is to say, by the presence of the feedback waveguide 4 a positive feedback is caused in the absorption and refractive index variation of the nonlinear material 3 and the above mentioned process is repeated, by which the feedback effect is markedly accelerated, reducing the refractive index to such an extent that total reflection will ultimately occur. In this case, by selecting the gain of the optical amplifier 5 larger than a certain value, the total reflection can be maintained even if the excitation light $P_{ex}$ is cut off. Furthermore, the reflectivity R is restored to zero by decreasing the current $I_{al}$ which is injected into the optical amplifier 5. Accordingly, by applying the signal light $P_s$ in the period during which the excitation light $P_{ex}$ and the injected current $I_{al}$ are both increased, the signal light $P_s$ is totally reflected and emitted through the outgoing side waveguide 1'. On the other hand, in a second interval in which no excitation light $P_{ex}$ is applied, there will not occur the above-mentioned process which gives rise to total reflection, and the signal light $P_s$ incident through the incoming side waveguide 1 is transmitted intact throughout the switch and is output through the outgoing side waveguide 2'. In other words, the signal light $P_s$ can be switched to the waveguide 1' or 2', depending on the present or absence of the excitation light $P_{ex}$. Incidentally, the component $P_o$ ascribable to the excitation light $P_{ex}$ is superimposed on the output from the waveguide 1' but it can be eliminated subsequently by an electric filter because each interval is longer than the time slot of the signal light $P_s$.

FIG. 5B shows a case where the feedback waveguide 4 is provided corresponding to each of the incoming side waveguides 1 and 2. The use of two feedback waveguides permits enhancement of the reflectivity of the nonlinear optical material 3 even if the excitation light $P_{ex}$ is low in intensity.

Figure 7A:
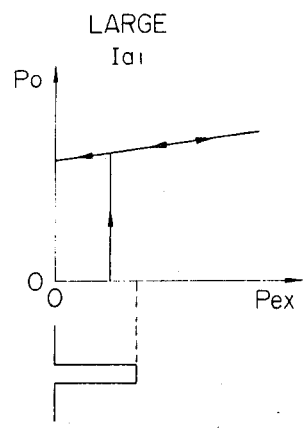
FIGS. 7A and 7B show the relationship between input light and output light in the embodiments depicted in FIGS. 5A and 5B.
Figure 7B:
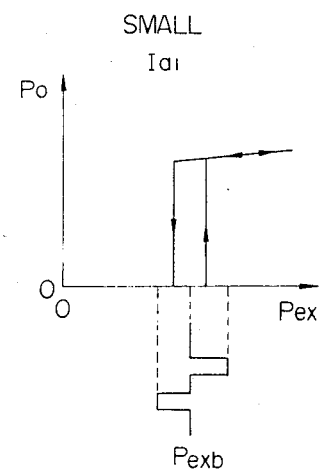

The above is a case where the gain of the optical amplifier 5, that is, the injection current $I_{al}$, is relatively large. FIG. 7A shows the relationship between the excitation light $P_{ex}$ and the output light $P_o$ from the waveguide 1'. As will be seen from FIG. 7A, once the excitation light $P_{ex}$ is applied, the output light $P_o$ continues to be provided (the total reflection state), and when the stop this state, the current $I_{al}$ must be cut off. On the other hand, when the current $I_{al}$ is relatively small, the output light $P_o$ shows such bistability as depicted in FIG. 7B. In this instance, each output P $_o$ can be switched from its high level (the total reflection state) to its low level (the zero reflection state) by holding the excitation light $P_{ex}$ at the center $P_{exb}$ of the bistable loop and adding thereto incremental or decremental pulses such as shown. In other words, the switching can be achieved with the excitation light $P_{ex}$ alone, and a direct current can be used as the current $I_{al}$. (Embodiment 2)

Figure 8:
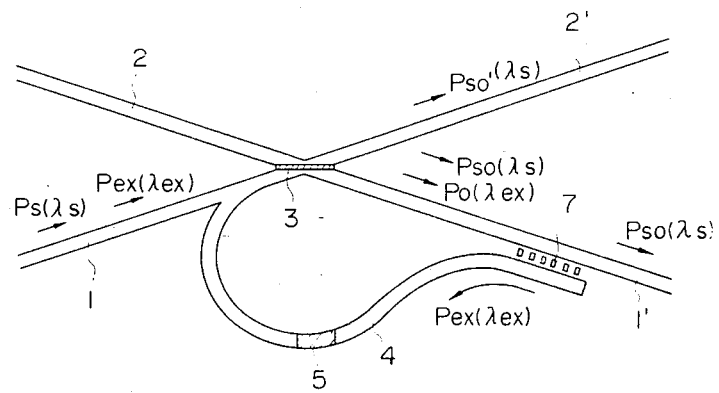
FIG. 8 illustrates a second embodiment of the optical waveguide switch of the present invention.

The above-described embodiment employs, as the feedback waveguide 4, a simple Y-shaped structure for coupling and branching the incoming and outgoing side waveguides 1 and 1'. FIG. 8 illustrates another embodiment in which the feedback waveguide 4 utilizes a Bragg reflection type branching filter having wavelength selectivity, for branching to the outgoing side. Generally speaking, the more the wavelength $\lambda_{ex}$ of the excitation light $P_{ex}$ approaches the absorption center wavelength $\lambda_O$ shown in FIGS. 4A and 4B, the more the absorption of light is saturated, and the insertion loss for the signal light $P_s$ is small when its wavelength $\lambda_s$ is longer than the absorption center wavelength $\lambda_O$ to some extent. Accordingly, in case of a system in which the wavelengths of the excitation light $P_{ex}$ and the signal light $P_s$ are adopted, so that $\lambda_{ex} \simeq \lambda_O$ and $\lambda_s > \lambda_{ex}$, the Bragg reflection type branching filter 7 is formed so that its Bragg wavelength may be equal to $\lambda_{ex}$. By this, only the signal light $P_{so}$ can be output from the outgoing side waveguide 1' and the insertion loss for the signal light $P_s$ can also be decreased.

Also in this embodiment the feedback waveguide 4 can be used for each of the incoming side waveguides 1 and 2.

The waveguides can be formed by ridge, rib and buried structures, using semiconductors such as the InGaAsP and the AlGaAs crystal systems.

As will be appreciated from the foregoing description, in the optical waveguide switch of the present invention, the optically non-linear material 3 is sued in its switching section to provide the zero reflection or total reflection state, depending on the intensity of light, and at least one feedback waveguide 4 is provided for controlling the optically nonlinear material 3 to permit switching of an optical signal even in case of a feeble excitation light.

Accordingly, the present invention implements a wide band optical switching element of a simple device structure with non opto-electro transducer, and hence is of great utility in practical use.

What we claim is:

1. An optical waveguide switch comprising, two waveguides intersecting at an angle in an intersection region intermediate corresponding light input regions of the two waveguides and corresponding light output regions thereof for outputting guided light, an optical switch element controlled by incident light energy as a function of the intensity thereof and disposed in said intersection region of the waveguides in the path of input light in the waveguides for switching a light output optical path from one of the waveguides to the other of the waveguides, and a loop feedback waveguide associated with one of the waveguides for branching output light back to the input region of said one of the waveguides.

2. An optical waveguide switching according to claim 1, in which said loop feedback waveguide is disposed in the vicinity of the intersection region in communication with said one of the waveguides.

3. An optical waveguide switch according to claim 1 in which said loop feedback waveguide is made of the same material as said one of the waveguides.

4. An optical waveguide switch according to claim 1, in which said loop feedback waveguide comprises a light amplifier.

5. An optical waveguide switch according to claim 1, in which said waveguides are made of a light conductive semiconductor material and said optically controlled switch element is made of an optically nonlinear material responsive to light rendered to be totally reflective when the incident light energy exceeds a given light intensity threshold.

6. An optical waveguide switch according to claim 1, in which said optically controlled switch element is an optically nonlinear material having a variable refractive index which undergoes a substantial variation as a function of the intensity of light incident thereon and is equal to the refractive index of said waveguides in case of no incident light.

7. An optical waveguide switch according to claim 1, in which said loop feedback waveguide comprises a Bragg reflection type branching filter.

8. An optical waveguide switch according to claim 7, in which the Bragg wavelength of the Bragg reflection type branching filter is equal to the wavelength of the excitation light to the Bragg reflection type branching filter.

9. An optical waveguide switch according to claim 1, in which said waveguides comprise optical fibers.

10. An optical waveguide switch according to claim 9, in which said loop feedback waveguide comprises an optical fiber.

11. An optical waveguide switch according to claim 1, in which said switch element is a semiconductor.

12. An optical waveguide switch comprising, two waveguides intersecting at an angle in an intersection region intermediate corresponding light input regions of the two waveguides and corresponding light output regions thereof for outputting guided light, an optical switch element controlled by incident light energy as a function of the intensity thereof and disposed in said intersection region of the waveguides in the path of input light in the waveguides for switching a light output optical path from one of the waveguides to the other of the waveguides and two loop feedback waveguides each associated with a corresponding one of the two waveguides for branching output light back to the input region of said corresponding one of the two waveguides.

* * * * *